(12) United States Patent
Ament et al.

(10) Patent No.: US 10,520,018 B2
(45) Date of Patent: Dec. 31, 2019

(54) GUIDING RAIL, SUBSTRUCTURE FOR SECURING A GUIDING RAIL AND ARRANGEMENT HAVING A GUIDING RAIL AND A SUBSTRUCTURE

(71) Applicant: Robert Bosch GmbH, Stuttgart (DE)

(72) Inventors: Helmut Ament, Kolitzheim (DE); Marius Feuerbach, Schweinfurt (DE); Werner Keller, Wasserlosen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/108,601

(22) Filed: Aug. 22, 2018

(65) Prior Publication Data

US 2019/0085901 A1 Mar. 21, 2019

(30) Foreign Application Priority Data

Sep. 15, 2017 (DE) ........................ 10 2017 216 423

(51) Int. Cl.
*F16C 29/00* (2006.01)
*F16C 37/00* (2006.01)
(52) U.S. Cl.
CPC .......... *F16C 29/005* (2013.01); *F16C 37/007* (2013.01)

(58) Field of Classification Search
CPC ...... F16C 29/004; F16C 29/005; F16C 37/00; F16C 37/007
USPC .......................................................... 384/9
See application file for complete search history.

(56) References Cited

U.S. PATENT DOCUMENTS 330,697 A * 11/1885 Harris

FOREIGN PATENT DOCUMENTS

| DE | 10 2014 220 587 A1 | 4/2016 |
| DE | 10 2016 208 916 A1 | 11/2017 |
| DE | 11 2017 002 297 T5 | 2/2019 |
| EP | 1 907 171 B1 | 7/2009 |
| JP | 2015-175422 A | 10/2015 |
| JP | 2017-201178 | * 11/2017 |
| WO | 2017/191736 A1 | 11/2017 |

* cited by examiner

*Primary Examiner* — James Pilkington
(74) *Attorney, Agent, or Firm* — Maginot, Moore & Beck LLP

(57) ABSTRACT

A guiding rail includes a guiding profile, a base face, a first end face, a second end face, and a groove. The guiding rail is configured to be placed against a substructure via the base face. The groove is introduced in the base face, and a line for cooling or heating the guiding rail is inserted into the groove.

11 Claims, 4 Drawing Sheets

GUIDING RAIL, SUBSTRUCTURE FOR SECURING A GUIDING RAIL AND ARRANGEMENT HAVING A GUIDING RAIL AND A SUBSTRUCTURE

This application claims priority under 35 U.S.C. § 119 to patent application no. DE 10 2017 216 423.9, filed on Sep. 15, 2017 in Germany, the disclosure of which is incorporated herein by reference in its entirety.

BACKGROUND

The disclosure relates to a guiding rail for guiding a guide carriage. Furthermore, the disclosure relates to a substructure for securing a guiding rail and an arrangement which has a guiding rail and a substructure.

DE 10 2014 220 587 A1 discloses a guiding rail. This has a rail base having a lower side. In this instance, the lower side is covered by a covering profile with which two channels for cooling the guiding rail are formed. By means of a dovetail securing system, the guiding rail can be secured to a substructure.

EP 1 907 171 discloses a guiding rail which has on the base face thereof a longitudinal groove as a cooling medium groove. Furthermore, the guiding rail has a large number of through-holes which serve to receive securing means in order to secure the guiding rail to a substructure. The through-holes in this instance intersect with the cooling medium groove, whereby a high level of sealing complexity is disadvantageously required

SUMMARY

In this regard, an object of the disclosure is to provide a guiding rail, a substructure and an arrangement by means of which in each case in a manner which is simple in terms of device technology a cooling of the guiding rail is enabled.

The object with regard to the guiding rail is achieved with the features disclosed herein, with regard to the substructure with the features disclosed herein, and with regard to the arrangement with the features disclosed herein.

According to the disclosure, a guiding rail or guiding rail arrangement or profile guiding rail for guiding a guide carriage is provided. The guiding rail may in this instance, for example, be part of a ball rail system or part of a roller rail system. The guiding rail may have a guide profile. Furthermore, the guiding rail may have a base face, by means of which it can be placed against a substructure. Furthermore, the guiding rail has, for example, two end faces which in particular face away from each other and are orientated in the longitudinal direction. Advantageously, a line recess may be introduced in the base face. A line, in particular for cooling or heating the guiding rail, for a fluid can then be inserted.

This solution has the advantage that a cooling or heating of the guiding rail can be implemented in a manner which is simple in terms of device technology since, as a result of the line, no additional sealing means are required. As a result of the line recess which is provided, a simple arrangement of the line is enabled. Consequently, an extremely simple handling of the guiding rail may be enabled since, for example, the line can be used together with the guiding rail as a module. Preferably, the guiding rail is constructed as a standard component. As a result of the line, improved sealing and a hermetic system are also provided, whereby no leakage occurs.

The line recess opens, for example, in one or both end faces. If it opens in both end faces, the line may extend over the entire length of the guiding rail.

According to the disclosure a substructure for securing a guiding rail is provided. This substructure may have a securing face which can be placed against the base face of the guiding rail. A line recess may be introduced in the securing face.

A line for a fluid may then be introduced in the line recess, in particular for cooling or heating the guiding rail.

This solution has the advantage that in a simple manner a substructure for cooling the guiding rail is provided.

The embodiments described above and below with regard to the guiding rail are also intended to apply below to the substructure.

In another embodiment of the disclosure, that is to say, the guiding rail and/or the substructure, a cross-section of the line recess may be at least partially constructed in such a manner that the line which is inserted into the line recess in the non-assembled state of the guiding rail protrudes from the base face or securing face. When the base face is in abutment with the substructure, the line may then in particular be resiliently and/or plastically deformed. The line is thereby at least slightly compressed, whereby an extensive abutment of the line in the line recess and on the base face or securing face is enabled. A cooling power or heating power can thereby be improved in a manner which is simple in terms of device technology.

The line is, for example, at least partially or substantially completely or completely formed from plastics material or metal, in particular steel. The line may consequently be constructed, for example, as a pipe or hose. A ratio of a groove width of the line recess to the cross-section of the line is, when the line of steel is used, preferably greater than or equal to 1. This has the advantage that a base width dimension of the guiding rail is not changed by the line being pressed in. In contrast, when a line of plastics material is used, a ratio less than 1 may be provided. The line, for example, a hose, is then slightly compressed thereby, whereby an extensive abutment face is achieved in order to improve a temperature control action.

That is to say, the line recess is constructed in such a manner that the line when the guiding rail is secured to the substructure is at least slightly deformed.

In another embodiment of the disclosure, the line, for example, in the unloaded state, may have an outer wall face which in cross-section is in particular approximately circular. Such a line is constructed in a simple manner in terms of device technology and when the guiding rail is assembled is comparatively easy to deform.

Preferably, the cross-section of the line recess and the cross-section of the line are at least partially adapted to each other or at least partially correspond to each other, in particular approximately. An extensive abutment of the line against the line recess can thereby be achieved in a manner which is simple in terms of device technology.

Advantageously, the line recess when viewed in cross-section is at least partially constructed in a curved manner. Consequently, the line can then adapt to the recess extensively, whereby an extensive heat transfer is provided. Preferably, the line recess has a base face which is curved or semi-circular when viewed in cross-section. It is conceivable that the base face is delimited by a recess flank which extends in the longitudinal direction or by two recess flanks which extend in the longitudinal direction. This/these flank(s) may then extend in each case from the base face of the guiding rail, respectively.

In order to further improve the cooling power or heating power, two line recesses may be introduced into the base face or securing face. These then extend, for example, beside each other, in particular in a longitudinal direction, or with parallel spacing with respect to each other. The two line recesses may then open in one, in particular common, or in both end faces.

In another embodiment of the disclosure, two line recesses may be connected by means of a pocket which is introduced into the base face or securing face. Alternatively or additionally, there may be provision, via a redirection portion which is arranged on the guiding rail, for a pocket to be introduced for connecting the line recesses. Consequently, an integral line may be guided from one line recess via the pocket to the other line recess. It is, for example, conceivable to construct a cooling medium channel or heating channel which extends, for example, via a loop. If two separate cooling channels having a respective line are provided, it is conceivable for the lines to have an identical throughflow direction or an opposed throughflow direction for a fluid.

The pocket is, for example, constructed in a curved manner in order to enable a buckle-free redirection of the line, in particular the line of plastics material. The redirection contour may in this instance be at least partially adapted to the line. The line is then, for example, substantially completely or completely or at least partially in abutment with the curved pocket. Consequently, it is conceivable for the pocket together with the line recesses to have a substantially U-like shape.

In a preferred embodiment of the disclosure, it is conceivable for the pocket to be constructed in such a manner that the line is arranged in the pocket with play or is at least partially or completely spaced apart from the pocket wall. Consequently, for example, it is conceivable for the pocket to have a larger cross-section than the line, which is particularly advantageous with a line of metal or steel.

Preferably, the two line recesses open in each of the two end faces, wherein they may then additionally be connected by means of the pocket. This is then, for example, spaced apart from the end faces. It is then thereby possible depending on the required use of the guiding rail for there to be selectively introduced two lines, which extend completely through the guiding rail or one line which is redirected via the pocket may be inserted.

In another embodiment of the disclosure, there may be provision for an insert component having a redirection contour to be inserted in the pocket. Consequently, the pocket may, for example, be used without a redirection contour for a line of steel and with the insert component for a line of plastics material.

For simple production, it is conceivable for the pocket to open in one of the end faces.

Preferably, the redirection component is arranged on an end face of the guiding rail or on an end face of the substructure.

In another embodiment of the disclosure, the guiding rail may have a rail base by means of which it can be secured to the substructure.

Preferably, one or more holes is/are introduced in the guiding rail. Via these, the guiding rail may then be able to be secured to the substructure using securing means, in particular using screws. The at least one hole or the plurality of holes may extend preferably substantially perpendicularly to the base face. The at least one hole or the plurality of holes terminate(s), for example, on the one hand, in the base face and, on the other hand, in the outer face, wherein they can face away from the base face and/or can be constructed substantially perpendicularly to the base face. The at least one hole or the plurality of holes may then be introduced, when viewed transversely relative to the longitudinal axis of the guiding rail, centrally and/or extend in a row. The line recess or the line recesses may then be introduced adjacent to or beside the hole or the holes. The holes are consequently introduced between the line recesses or beside the line recess or at least partially intersect with the line recesses. Consequently, the line recesses may be configured and constructed independently of the holes. Furthermore, damage to the lines when securing the guiding rail using the securing means can be prevented. If the hole or the holes intersect(s) with the line recess or the line recesses and/or the pocket, for example, for reasons of structural space, it is nonetheless not necessary to introduce additional sealing means since the fluid is guided in the line.

Preferably, the line or the lines is/are arranged in a movable manner in the line recesses in a manner which is simple in terms of device technology. For simplified handling, it is conceivable to secure the line or the lines to the guiding rail. For example, a line or the lines is/are adhesively bonded and/or welded and/or soldered and/or clamped to the guiding rail. They may consequently, for example, be connected to the guiding rail(s) and/or the substructure in a non-positive-locking and/or positive-locking and/or materially engaging manner.

It is conceivable to screw the guiding rail to the substructure from above or from below. Alternatively or additionally, the guiding rail may have a dovetail arrangement at the rail base side, via which it can be secured to the substructure, for example, via a pressure piece.

According to the disclosure, an arrangement having a guiding rail according to one or more of the preceding aspects and having a substructure is provided. Alternatively, an arrangement having a substructure according to one or more of the preceding aspects and a guiding rail may be provided. Furthermore, it is alternatively conceivable for an arrangement having a guiding rail according to one or more of the preceding aspects and a substructure according to one or more of the preceding aspects to be provided.

BRIEF DESCRIPTION OF THE DRAWINGS

Preferred embodiments of the disclosure are explained in greater detail below with reference to schematic drawings, in which.

DETAILED DESCRIPTION

Figure 1:
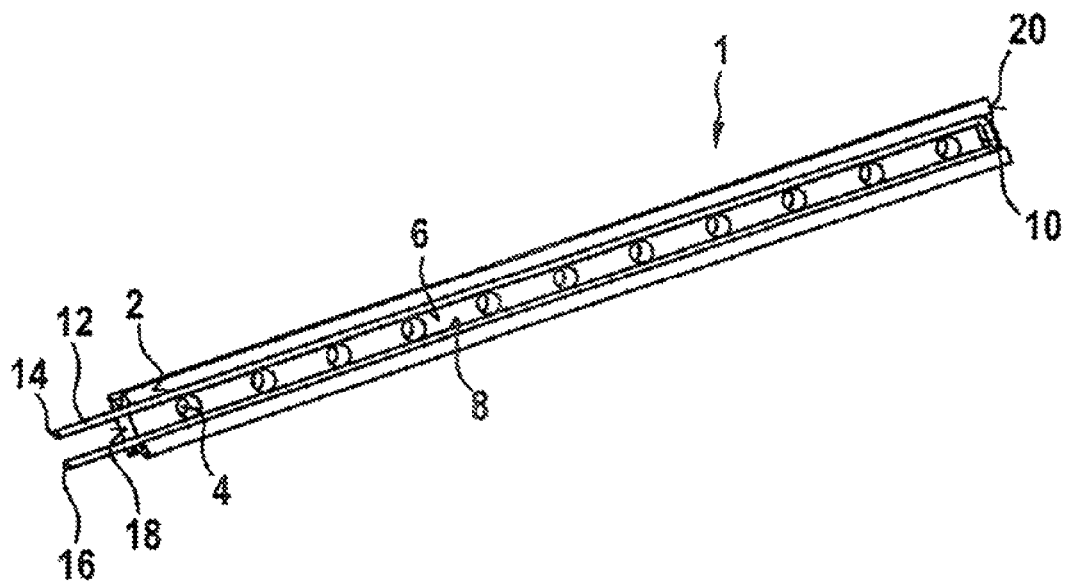
FIG. 1 is a perspective illustration of a guiding rail according to an embodiment.

According to FIG. 1, a guiding rail 1 is shown. This rail has a base face 2, via which it can be placed against a substructure. The guiding rail 1 is intended to be used with a guide carriage which has at least one row of rolling members. It extends in a longitudinal direction. For each of the rows of rolling members, the guiding rail 1 has a running face which extends parallel with the longitudinal direction. The running faces are typically formed from hardened steel and are adapted with a tight fit to the rolling members. Via a plurality of securing holes 4 which extend approximately transversely relative to the base face 2 and which are arranged in a row centrally with respect to the guiding rail 1, this rail can be secured to the substructure which is not illustrated. Furthermore, the guiding rail 1 has a first and a second line recess 6, 8 which extend with parallel spacing and in a longitudinal direction. These recesses are introduced as a groove into the guiding rail 1 from the base face 2. Via a pocket 10, the line recesses 6, 8 are connected to each other. A line 12 which is constructed as a steel pipe is placed in the line recesses 6, 8 and in the pocket 10. End portions 14, 16 of the line 12 protrude from an end face 18 of the guiding rail 1. The pocket 10 opens in another end face 20. The line 12 is consequently constructed in a U-shaped manner and inserted in the line recesses 6, 8 which are arranged in a U-shaped manner with the pocket 10. A fluid, in particular for cooling or heating the guiding rail 1, may be guided through the line 12.

Figure 2:
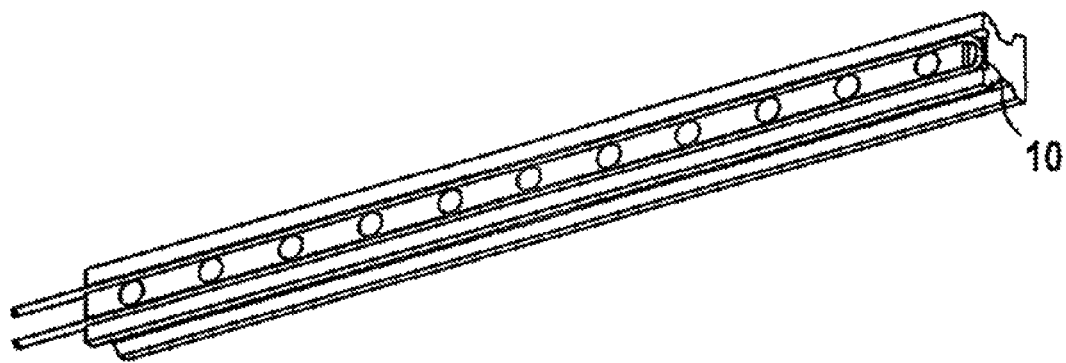
FIG. 2 is a perspective illustration of the guiding rail from FIG. 1.
Figure 3:
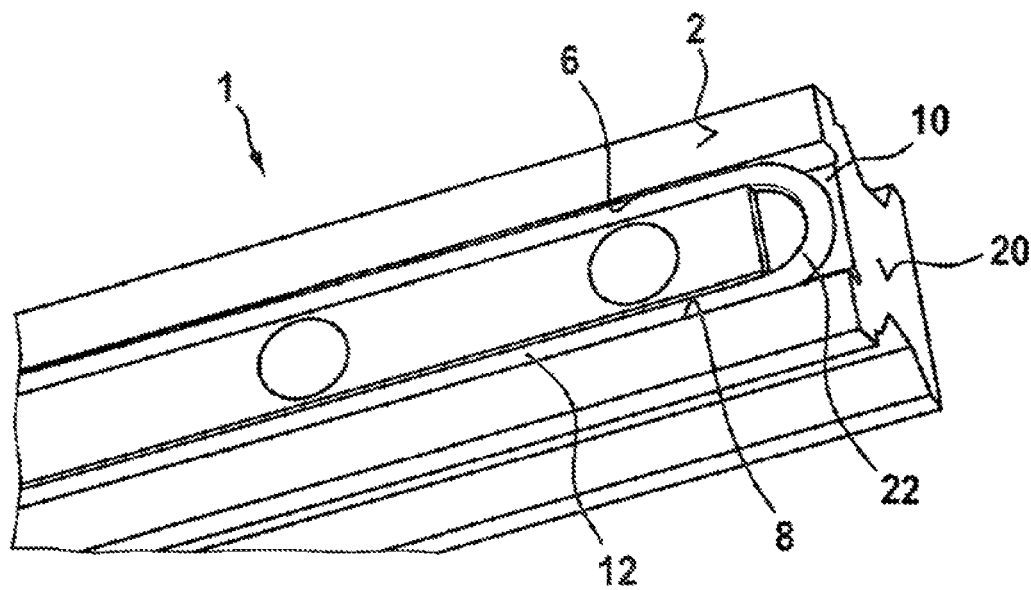
FIG. 3 is a perspective illustration of a cut-out of the guiding rail from FIGS. 1 and 2.

According to FIGS. 2 and 3, the pocket 10 is illustrated. The depth thereof when viewed from the base face 2 substantially corresponds to the depth of the line recesses 6, 8. A depth of the pocket 10 from the end face 20 when viewed in the direction of the longitudinal axis of the guiding rail 1 is in this instance greater than a cross-section of the line 12. These depths were selected in such a manner that the line 12 can be guided via a curved portion 22 from the line recess 6 to the line recess 8, without axially protruding from the guiding rail 1.

Figure 4:
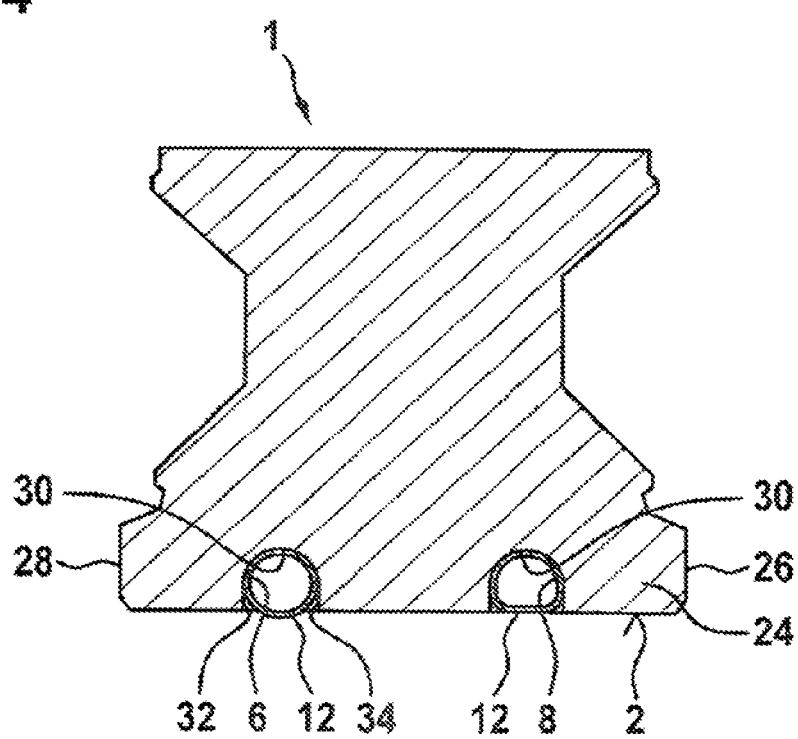
FIG. 4 is a cross-section of the guiding rail according to the embodiment.

According to FIG. 4, the guiding rail 1 has a rail base 24 which, on the one hand, has the base face 2 and, on the other hand, two stop edges 26 and 28. Furthermore, the line recesses 6 and 8 are illustrated. It can be seen that they have a curved base face 30 which is formed between two recess flanks 32 and 34. In FIG. 4, the line 12 in the line recess 6 is shown in the non-assembled state of the guiding rail 1. In this instance, the line 12 protrudes slightly from the base face 2. The line recess 8 in FIG. 4 shows in contrast an assembled state of the guiding rail 1. In this instance, the line 12 is completely received in the line recess 8 in a state deformed as a result of abutment against the substructure. Consequently, the line 12 abuts the guiding rail 1 in the assembled state of the guiding rail 1, for example, with pretensioning, in the line recesses 6, 8 and the pocket 10, whereby an extensive contact of the guiding rail 1 with the line 12 is provided.

Figure 5:
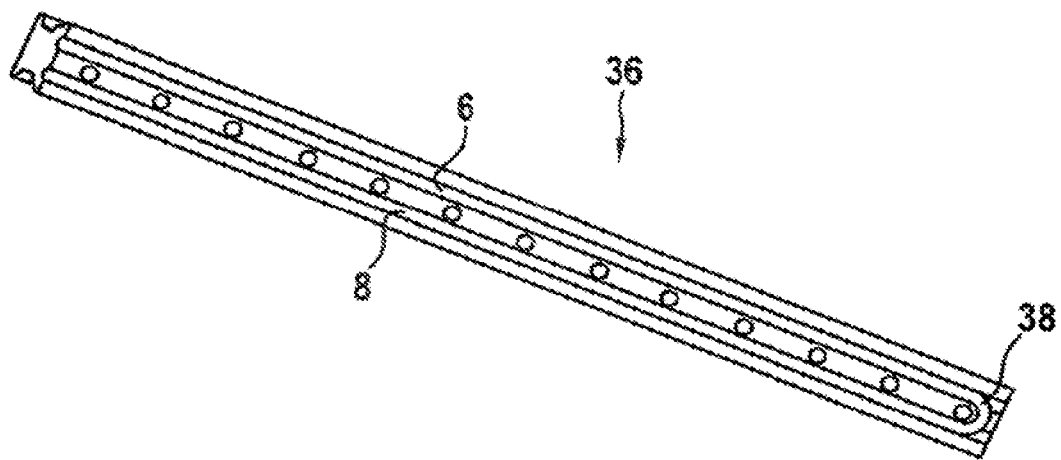
FIG. 5 is a perspective illustration of a guiding rail according to an additional embodiment.

FIG. 5 shows a guiding rail 36, in which a pocket 38 is constructed in a curved manner and does not open in an end face. This is advantageous with lines of plastics material in order to assemble them in a buckle-free manner in the guiding rail 36. The pocket 38 is then connected to the line recesses 6 and 8.

Figure 6:
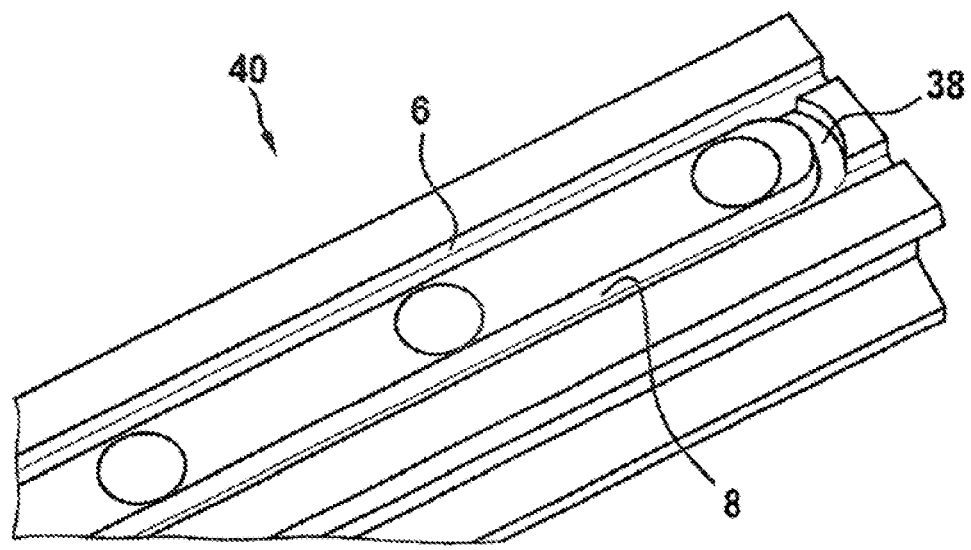
FIG. 6 is a perspective illustration of a cut-out of a guiding rail according to an additional embodiment.

FIG. 6 shows a guiding rail 40. In this instance, there is provision for the line recesses 6, 8 to axially extend completely through the guiding rail 40. In addition, the curved pocket 38 is introduced. Such a guiding rail 40 may be used in an extremely variable manner. It is conceivable to insert a line into the line recess 6 and/or a line into the line recess 8, which protrude from both end faces of the guiding rail 40. Alternatively, there may be provided a single line which extends from the line recess 6 via the pocket 38 as far as the line recess 8.

Figure 7:
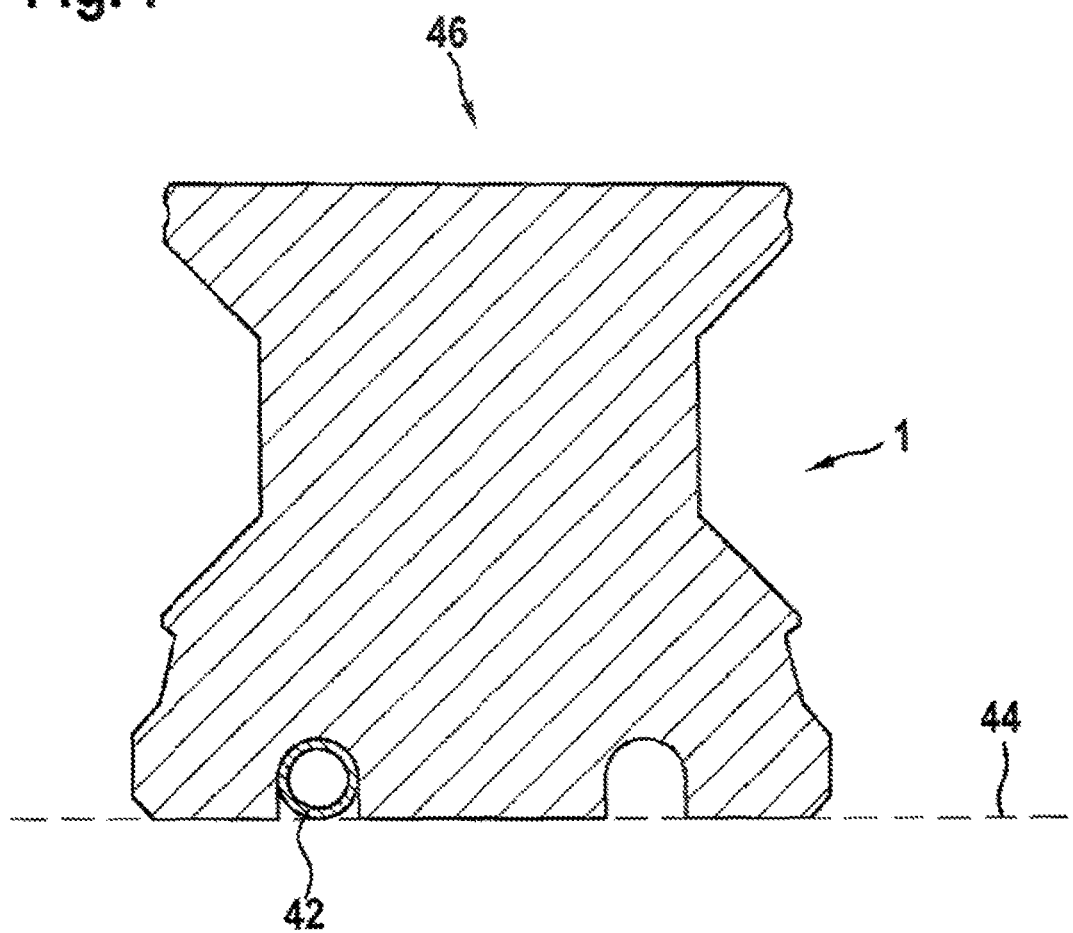
FIG. 7 is a cross-section of a guiding rail according to another embodiment.

FIG. 7 shows a line 42, which in the non-assembled state of the guiding rail 1 is completely arranged therein. Furthermore, according to FIG. 7, a substructure 44 is illustrated schematically with a broken line. The substructure 44 and the guiding rail 1 form an arrangement 46.

There is disclosed a guiding rail which has a groove in which a line for cooling or heating the guiding rail is inserted.

LIST OF REFERENCE NUMERALS

1; 36; 40 Guiding rail
2 Base face
4 Holes
6, 8 Line recess
10; 38 Pocket
12; 42 Line
14, 16 End portion
18, 20 End face
22 Curved portion
24 Rail base
26 Stop edge
28 Stop edge
30 Base face
32, 34 Recess flank
44 Substructure
46 Arrangement

What is claimed is:

1. A guiding rail for guiding a guide carriage, the guiding rail comprising:
   a guiding profile;
   a base face via which the guiding rail is configured to be placed against a substructure;
   a first end face;
   a second end face; and
   at least one line recess introduced in the base face and into which a line for a fluid is inserted,
   wherein a cross-section of the at least one line recess is at least partially configured such that the line inserted into the at least one line recess, in a non-assembled state, protrudes from the base face and is deformed when the base face is in abutment with the substructure.

2. The guiding rail according to claim 1, wherein the at least one line recess opens in at least one of the first and second end faces.

3. The guiding rail according to claim 1, wherein the cross-section of the at least one line recess and a cross-section of the line are at least partially adapted to each other or at least partially correspond to each other.

4. The guiding rail according to claim 1, wherein the cross-section of the at least one line recess is at least partially curved.

5. The guiding rail according to claim 1, wherein:
   the at least one line recess includes a first line recess defined in the base face and a second line recess defined in the base face, and
   the second line recess extends beside the first line recess.

6. The guiding rail according to claim 5, wherein the first and second line recesses each open in at least one of the first and second end faces.

7. The guiding rail according to claim 5, wherein the first and second line recesses are connected via a pocket introduced into the base face or via a pocket introduced in a redirection portion arranged on the guiding rail.

8. The guiding rail according to claim 7, wherein the pocket is curved.

9. The guiding rail according to claim 7, further comprising:
at least one hole introduced in the guiding rail,
wherein the guiding rail is configured to be secured to the substructure via the at least one hole via a securing member, and
wherein the at least one hole is spaced apart from the at least one line recess and/or from the pocket or intersects with the at least one line recess and/or the pocket.

10. A guiding rail for guiding a guide carriage, the guiding rail comprising:
a guiding profile;
a base face via which the guiding rail is configured to be placed against a substructure;
a first end face;
a second end face;
a first line recess introduced in the base face and into which a line for a fluid is inserted a second line recess introduced in the base face, wherein the second line recess extends beside the first line recess,
wherein:
the first and second line recesses are connected via a pocket introduced into the base face or via a pocket introduced in a redirection portion arranged on the guiding rail
the pocket includes a pocket wall; and
the pocket is configured such that the line is arranged in the pocket with play or is at least partially or completely spaced apart from the pocket wall.

11. An arrangement, comprising:
a guiding rail configured to guide a guide carriage, the guiding rail including:
a guiding profile;
a base face via which the guiding rail is configured to be placed against the substructure;
a first end face;
a second end face; and
at least one line recess introduced in the base face and into which the line for the fluid is inserted; and
a substructure to which the base face of the guiding rail is secured,
wherein a cross-section of the at least one line recess is at least partially configured such that the line inserted into the at least one line recess, in a non-assembled state, protrudes from the base face and is deformed when the base face is in abutment with the substructure.

* * * * *